(12) United States Patent
Matsumura et al.

(10) Patent No.: US 12,545,784 B2
(45) Date of Patent: Feb. 10, 2026

(54) RESIN COMPOSITION, RESIN COMPOSITION FILM, CURED FILM, HOLLOW STRUCTURE USING SAME, AND SEMICONDUCTOR DEVICE

(71) Applicant: TORAY INDUSTRIES, INC., Tokyo (JP)

(72) Inventors: Kazuyuki Matsumura, Otsu (JP); Yoshiko Tateoka, Otsu (JP); Akira Shimada, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 305 days.

(21) Appl. No.: 17/762,900

(22) PCT Filed: Aug. 27, 2020

(86) PCT No.: PCT/JP2020/032296
§ 371 (c)(1),
(2) Date: Mar. 23, 2022

(87) PCT Pub. No.: WO2021/059843
PCT Pub. Date: Apr. 1, 2021

(65) Prior Publication Data
US 2022/0372288 A1    Nov. 24, 2022

(30) Foreign Application Priority Data

Sep. 24, 2019 (JP) ................................ 2019-172590

(51) Int. Cl.
| | | |
|---|---|---|
| *C08L 77/06* | (2006.01) | |
| *C08J 5/18* | (2006.01) | |
| *C08L 63/00* | (2006.01) | |
| *C08L 79/08* | (2006.01) | |

(52) U.S. Cl.
CPC ................ *C08L 77/06* (2013.01); *C08J 5/18* (2013.01); *C08L 63/00* (2013.01); *C08L 79/08* (2013.01); *C08L 2203/16* (2013.01); *C08L 2203/20* (2013.01)

(58) Field of Classification Search
CPC .......... C08L 77/06; C08L 63/00; C08L 79/08; C08L 2203/16; C08L 2203/20; C08J 5/18; C08J 7/042; C08J 2367/02; C08J 2423/12; C08J 2477/00; C08J 2479/08; C08G 73/22; C08G 69/32; C08G 69/40; C08G 73/1078; C08G 73/14; C08G 59/32; C08G 59/3218; C08G 59/3245; C08G 69/42; C08G 73/1039; C08G 59/4064; C08G 59/42; C08G 59/687; G03F 7/038; G03F 7/0387; C08K 5/34924; C08K 5/1515; C08K 5/5435; C09D 177/00; C09D 179/08; H01L 23/293

See application file for complete search history.

(56) References Cited

U.S. PATENT DOCUMENTS

| | | | |
|---|---|---|---|
| 5,169,911 A | 12/1992 | Lupinski et al. | |
| 2011/0143103 A1 | 6/2011 | Furuya et al. | |
| 2013/0079490 A1* | 3/2013 | Matsumoto | ........... C07C 235/82 560/116 |
| 2017/0102614 A1* | 4/2017 | Imaizumi | .............. G03F 7/0758 |
| 2018/0031970 A1 | 2/2018 | Arimoto et al. | |

FOREIGN PATENT DOCUMENTS

| | | |
|---|---|---|
| JP | 2013-105063 A | 5/2013 |
| KR | 10-2016-0020229 A | 2/2016 |
| TW | 201136997 A1 | 11/2011 |
| WO | WO 2016/035593 A1 | 3/2016 |
| WO | WO 2016/140024 A1 | 9/2016 |
| WO | WO 2017/170032 A1 | 10/2017 |
| WO | WO 2019/131896 A1 | 7/2019 |

OTHER PUBLICATIONS

Author Unknown; Rikacid TDAQ-100 (Year: 2020).*
English Translation for Koyanagi et al (WO 03/072634 A1) (Year: 2003).*
English Translation for Ikeda et al (WO 2017/170032 A1) (Year: 2017).*
Author Unknown Raw Materials for Resins, Rika (Year: 2019).*
English Translation for Arai et al (JP H11184087 A) (Year: 1999).*
Translation for Choi (WO 2015/142000 A1) (Year: 2015).*
English Translation for (JP 2017128637 A) (Year: 2017).*
International Search Report, issued in PCT/JP2020/032296, PCT/ISA/210, dated Nov. 17, 2020.
Written Opinion of the International Searching Authority, issued in PCT/JP2020/032296, PCT/ISA/237, dated Nov. 17, 2020.
Extended European Search Report for European Application No. 20868050.4, dated May 31, 2023.
Taiwanese Office Action and Search Report for Taiwanese Application No. 109130823, dated Apr. 25, 2024.

* cited by examiner

*Primary Examiner* — Nathan L Van Sell
(74) *Attorney, Agent, or Firm* — Birch, Stewart, Kolasch & Birch, LLP

(57) ABSTRACT

In order to provide a resin composition excellent in pattern processability and film strength, a resin composition film, and a semiconductor device using these, there is provided a resin composition including (A) a polymer compound, (B) a cationic polymerizable compound, and (C) a cationic polymerization initiator, in which (A) the polymer compound has a carboxylic acid residue at a molecular chain terminal.

11 Claims, No Drawings

RESIN COMPOSITION, RESIN COMPOSITION FILM, CURED FILM, HOLLOW STRUCTURE USING SAME, AND SEMICONDUCTOR DEVICE

TECHNICAL FIELD

The present invention relates to a resin composition, a resin composition film, a cured film, a hollow structure using the same, and a semiconductor device. More specifically, the present invention relates to a resin composition suitably used for surface protective films or interlayer insulating films in semiconductor elements or inductor devices, structures of microelectromechanical systems (MEMS), and the like.

BACKGROUND ART

Conventionally, polyimide-based materials and polybenzoxazole-based materials excellent in heat resistance, electrical insulation, and mechanical properties have been widely used for the surface protective films and the interlayer insulating films in semiconductor elements. As higher density and higher performance of the semiconductor elements are recently requested, materials having photosensitivity have been required for the surface protective films and the interlayer insulating films from the viewpoint of production efficiency.

On the other hand, photosensitive materials have been required to be processed at a high aspect ratio for various packaging structures in semiconductor elements and MEMS in recent years. In order to meet such a demand, a chemical amplification type photocationic polymerization-based photosensitive material is disclosed (For example, Patent Document 1). In addition, a photocationic polymerization-based material intended to improve mechanical properties and thermal properties by including an epoxy resin having a specific structure in a chemical amplification type photocationic polymerization system is disclosed (For example, Patent Document 2).

PRIOR ART DOCUMENTS

Patent Documents

Patent Document 1: WO 2008/007764 A
Patent Document 2: JP 2019-38964 A

SUMMARY OF THE INVENTION

Problems to be Solved by the Invention

However, in the photocationic polymerization-based material as described above, it has been difficult to achieve both sufficient mechanical properties and thermal properties. Specifically, when the crosslinking density is improved in order to improve the glass transition temperature of a cured film as an index of thermal properties, the tensile strength and the tensile elongation of the cured film as an index of mechanical properties are poor. On the other hand, when a flexible component is introduced in order to improve the tensile strength and the tensile elongation, the glass transition temperature of the cured film decreases.

In view of such circumstances, as a result of intensive studies, the present inventors have found that a photocationic polymerization-based material using at least one polymer compound selected from the group consisting of polyamide, polyimide, polyamideimide, and polybenzoxazole has pattern processability, and is excellent in the glass transition temperature of the cured film and the tensile strength and the tensile elongation of the cured film.

SOLUTIONS TO THE PROBLEMS

The present invention for solving the above problems is as follows.

A resin composition including (A) a polymer compound and (B) a cationic polymerizable compound, in which
(A) the polymer compound is at least one compound selected from the group consisting of polyamide, polyimide, polyamideimide, and polybenzoxazole, and
the resin composition further includes (C) a cationic polymerization initiator.

Effects of the Invention

The present invention provides a resin composition having pattern processability and excellent in the glass transition temperature of a cured film and the tensile strength and the tensile elongation of a cured film under a low temperature curing condition, a resin composition film, a cured film, a hollow structure using these, and a semiconductor device.

EMBODIMENTS OF THE INVENTION

A resin composition of the present invention includes (A) a polymer compound and (B) a cationic polymerizable compound, in which (A) the polymer compound is at least one compound selected from the group consisting of polyamide, polyimide, polyamideimide, and polybenzoxazole, and the resin composition further includes (C) a cationic polymerization initiator.

As described later, (A) the polymer compound is at least one compound selected from the group consisting of polyamide, polyimide, polyamideimide, and polybenzoxazole. Note that a polyimide precursor and a polybenzoxazole precursor each correspond to the polyamide described above.

When the resin composition of the present invention includes (A) the polymer compound, the resin composition is excellent in film formability upon forming into a film shape, and is excellent in tensile strength and tensile elongation of a cured film. The weight average molecular weight of (A) the polymer compound is not particularly limited, but the weight average molecular weight thereof is preferably 1,000 or more and 200,000 or less. In addition, (A) the polymer compound may be used alone or two or more thereof may be used in combination. Note that the weight average molecular weight of (A) the polymer compound in the present invention is measured by a gel permeation chromatography (GPC method) and calculated in terms of polystyrene.

In addition, the resin composition of the present invention preferably contains (A) the polymer compound having a carboxylic acid residue at a molecular chain terminal. More specifically, the resin composition of the present invention contains (A) the polymer compound, and the molecular chain terminal of (A) the polymer compound preferably has a structure derived from the carboxylic acid residue. As long as the resin composition of the present invention contains (A) the polymer compound having a structure in which the molecular chain terminal is derived from the carboxylic acid residue, the resin composition can also contain the polymer compound having a structure in which the molecular chain terminal is not derived from the carboxylic acid residue.

Note that, when the resin composition of the present invention contains a polymer compound in which the molecular chain terminal does not have a structure derived from the carboxylic acid residue, the content thereof is preferably as small as possible. Specifically, the content of the polymer compound in which the molecular chain terminal does not have a structure derived from the carboxylic acid residue is preferably 0 parts by mass or more and 10 parts by mass or less, more preferably 0 parts by mass or more and 5 parts by mass or less, and particularly preferably 0 parts by mass or more and 2 parts by mass or less, based on the total 100 parts by mass of (A) the polymer compound in which the molecular chain terminal has a structure derived from the carboxylic acid residue.

In addition, the resin composition of the present invention preferably contains (A) the polymer compound having the structure in which the molecular chain terminal is derived from the carboxylic acid residue, and as long as the resin composition contains (A) the polymer compound having the structure in which the molecular chain terminal is derived from the carboxylic acid residue, the content thereof is not particularly limited, but in 100% by mass of the resin composition, it preferably contains 20% by mass or more and 95% by mass or less of (A) the polymer compound having the structure in which the molecular chain terminal is derived from the carboxylic acid residue, more preferably 30% by mass or more and 85% by mass or less thereof, and particularly preferably 30% by mass or more and 70% by mass or less thereof. When the resin composition contains 20% by mass or more of (A) the polymer compound having the structure in which the molecular chain terminal is derived from the carboxylic acid residue, the film strength of the cured film is improved. On the other hand, when the content of (A) the polymer compound having the structure in which the molecular chain terminal is derived from the carboxylic acid residue is 95% by mass or less in the resin composition, the cationic polymerization reaction easily proceeds, and the chemical resistance of the cured film is improved. In addition, the content of (A) the polymer compound having the structure in which the molecular chain terminal is derived from the carboxylic acid residue is more preferably 70% by mass or less in the resin composition.

(A) The polymer compound preferably has the structure in which the molecular chain terminal is derived from the carboxylic acid residue. When the molecular chain terminal of (A) the polymer compound has a structure derived from the carboxylic acid residue, the molecular chain terminal can have a molecular structure that does not have an amine end structure which can serve as an inhibitory functional group for cationic polymerization. As a result, it is preferable from the viewpoint that sufficient cationic polymerizability can be exhibited even when polyamide, polyimide, or polyamideimide is used.

Here, the structure derived from the carboxylic acid residue at the molecular chain terminal of (A) the polymer compound is an organic group derived from the carboxylic acid residue that can constitute polyamide, polyimide, or polyamideimide, and refers to a structure derived from a monocarboxylic acid, a dicarboxylic acid, a monoacid chloride compound, a diacid chloride compound, and a tetracarboxylic acid, or an acid anhydride and an acid dianhydride thereof, or the like. Among the above, the structure in which the molecular chain terminal of (A) the polymer compound is derived from the carboxylic acid residue is particularly preferably a structure derived from a tetracarboxylic dianhydride. The structure in which the molecular chain terminal is derived from a tetracarboxylic dianhydride is preferable from the viewpoint of improving the storage stability of the resin composition before thermal curing. On the other hand, it is preferable from the viewpoint that, as the cured film, a carboxylic acid anhydride group at a terminal serves as a reactive functional group, and the heat resistance and the chemical resistance are improved after thermal curing.

Furthermore, (A) the polymer compound is preferably alkali-soluble. Alkali-soluble is preferable, because development can be performed with an alkaline aqueous solution without using an organic solvent that causes an environmental load in development upon pattern processing. The term "alkali-soluble" as used herein refers to a substance that dissolves in an amount of 0.1 g or more at 25° C. with respect to 100 g of a 2.38% by mass aqueous solution of tetramethylammonium hydroxide. In order to exhibit alkali solubility, (A) the polymer compound desirably has an alkali-soluble functional group. The alkali-soluble functional group is a functional group having acidity, and specific examples thereof include a phenolic hydroxyl group, a carboxyl group, and a sulfonic acid group. Among the above-described alkali-soluble functional groups, the alkali-soluble functional group is preferably a phenolic hydroxyl group because of problems such as storage stability of the photosensitive resin composition and corrosion to copper wiring as a conductor. That is, (A) the polymer compound is preferably a compound having a phenolic hydroxyl group in a molecular chain.

Examples of the structure (organic group) in which the molecular chain terminal of (A) the polymer compound is derived from the carboxylic acid residue include an aromatic dicarboxylic acid, an aromatic acid dianhydride, an alicyclic dicarboxylic acid, an alicyclic acid dianhydride, an aliphatic dicarboxylic acid, and an aliphatic acid dianhydride, but are not limited thereto. In addition, these are used alone or in combination of two or more thereof.

Among those, an organic group derived from an alicyclic carboxylic acid residue is preferable from the viewpoint that a transparent resin can be designed for a wavelength used upon patterning and as a result, fine pattern processability can be exhibited with a thick film.

In the present invention, (A) the polymer compound is preferably the polyamide, the polyimide, or the polyamideimide, and is preferably a compound having at least one or more structures selected from the structures represented by the general formulae (1) and (2).

[Chemical Formula 1]

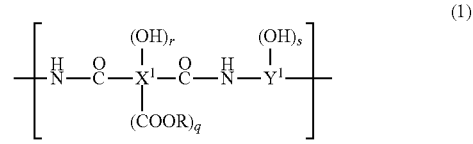

(1)

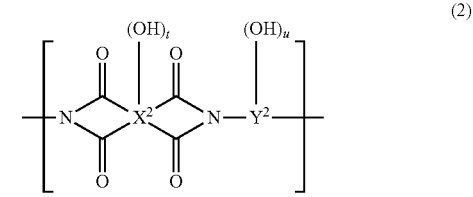

(2)

(In the general formulae (1) and (2), $X^1$ and $X^2$ each independently represent a divalent to decavalent organic group, $Y^1$ and $Y^2$ each independently represent a divalent to tetravalent organic group, and R represents a hydrogen atom or an organic group having 1 to 20 carbon atoms. q is an integer of 0 to 2, and r, s, t, and u are each independently an integer of 0 to 4.)

$Y^1$ and $Y^2$ in the general formulae (1) and (2) represent divalent to tetravalent organic groups, and represent diamine-derived organic groups.

$Y^1$ and $Y^2$ in the general formulae (1) and (2) of (A) the polymer compound preferably include a diamine residue having a phenolic hydroxyl group. When the diamine residue having a phenolic hydroxyl group is included, moderate solubility of the resin in an alkaline developer can be obtained, therefore a high contrast between an exposed portion and an unexposed portion can be obtained, and a desired pattern can be formed.

Specific examples of the diamine having a phenolic hydroxyl group include aromatic diamines such as bis(3-amino-4-hydroxyphenyl)hexafluoropropane, bis(3-amino-4-hydroxyphenyl)sulfone, bis(3-amino-4-hydroxyphenyl)propane, bis(3-amino-4-hydroxyphenyl)methylene, bis(3-amino-4-hydroxyphenyl)ether, bis(3-amino-4-hydroxy)biphenyl, 2,2'-ditrifluoromethyl-5,5'-dihydroxyl-4,4'-diaminobiphenyl, bis(3-amino-4-hydroxyphenyl)fluorene, and 2,2'-bis(trifluoromethyl)-5,5'-dihydroxybenzidine, compounds obtained by substituting some of hydrogen atoms of these aromatic rings and hydrocarbons with an alkyl group or a fluoroalkyl group having 1 to 10 carbon atoms, a halogen atom, or the like, and diamines having the structures shown below, but are not limited thereto. The other diamine to be copolymerized can be used as it is, or as a corresponding diisocyanate compound or trimethylsilylated diamine. In addition, these two or more diamine components may be used in combination.

[Chemical Formula 2]

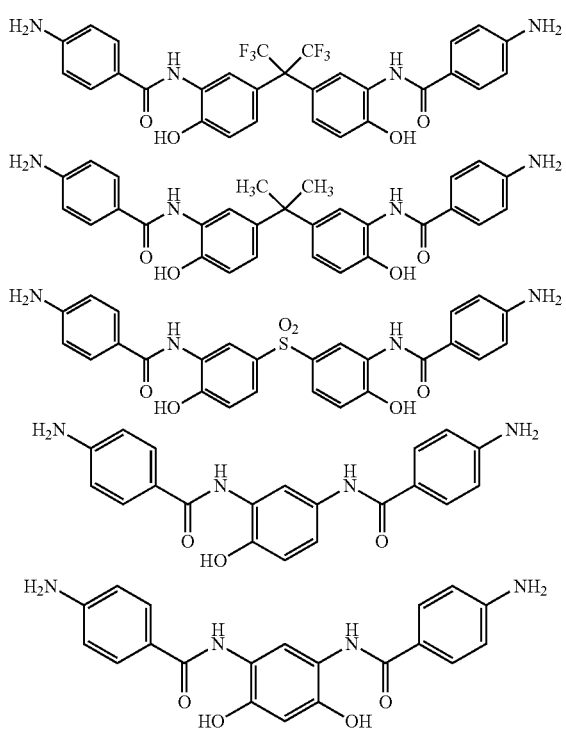

[Chemical Formula 3]

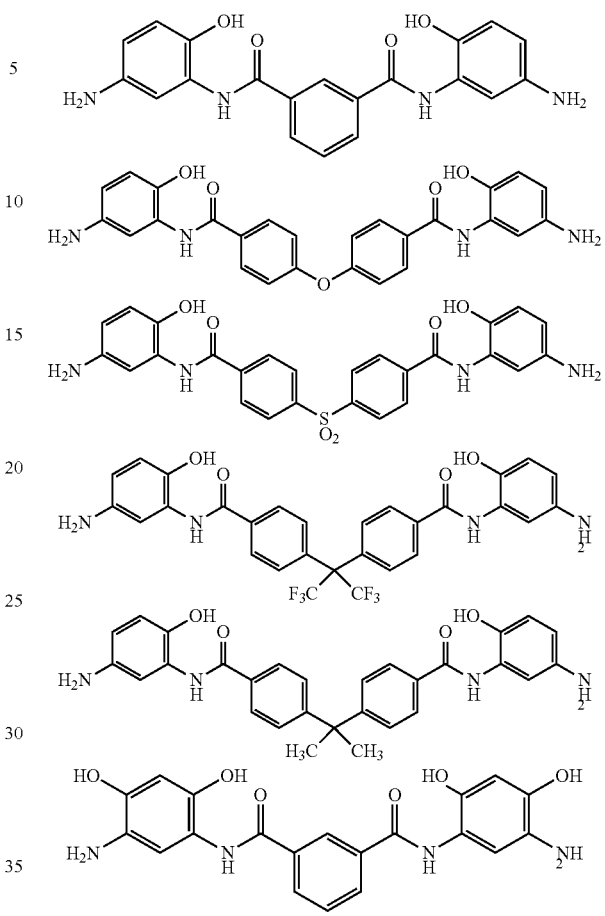

$Y^1$ and $Y^2$ in the general formulae (1) and (2) may contain a diamine residue having aromatic series other than the above. By copolymerizing these, the heat resistance can be improved. Specific examples of the diamine residue having aromatic series include aromatic diamines such as 3,4'-diaminodiphenyl ether, 4,4'-diaminodiphenyl ether, 3,4'-diaminodiphenyl methane, 4,4'-diaminodiphenyl methane, 3,4'-diaminodiphenyl sulfone, 4,4'-diaminodiphenyl sulfone, 3,4'-diaminodiphenyl sulfide, 4,4'-diaminodiphenyl sulfide, 1,4-bis(4-aminophenoxy)benzene, benzine, m-phenylenediamine, p-phenylenediamine, 1,5-naphthalenediamine, 2,6-naphthalenediamine, bis(4-aminophenoxyphenyl)sulfone, bis(3-aminophenoxyphenyl)sulfone, bis(4-aminophenoxy)biphenyl, bis{4-(4-aminophenoxy)phenyl}ether, 1,4-bis(4-aminophenoxy)benzene, 2,2'-dimethyl-4,4'-diaminobiphenyl, 2,2'-diethyl-4,4'-diaminobiphenyl, 3,3'-dimethyl-4,4'-diaminobiphenyl, 3,3'-diethyl-4,4'-diaminobiphenyl, 2,2',3,3'-tetramethyl-4,4'-diaminobiphenyl, 3,3',4,4'-tetramethyl-4,4'-diaminobiphenyl, and 2,2'-bis(trifluoromethyl)-4,4'-diaminobiphenyl, and compounds obtained by substituting some of hydrogen atoms of these aromatic rings and hydrocarbons with an alkyl group or a fluoroalkyl group having 1 to 10 carbon atoms, a halogen atom, or the like, but are not limited thereto. The other diamine to be copolymerized can be used as it is, or as a corresponding diisocyanate compound or trimethylsilylated diamine. In addition, these two or more diamine components may be used in combination.

In the general formula (1) and the general formula (2) in the present invention, $X^1$ and $X^2$ represent carboxylic acid residues, and are divalent to decavalent organic groups.

The carboxylic acid residue preferably has a structure derived from an alicyclic tetracarboxylic dianhydride. That is, (A) the polymer compound is at least one compound selected from the group consisting of polyamide, polyimide, and polyamideimide, and preferably further has the structure derived from the alicyclic tetracarboxylic dianhydride. When the carboxylic acid residue has the structure derived from the alicyclic tetracarboxylic dianhydride, the light transmittance of the resin composition with respect to an exposure wavelength is increased, and processing with 20 µm or more of a thick film is facilitated. Furthermore, although the reason is not clear, it is preferable from the viewpoint that, when (A) the polymer compound has the structure derived from the alicyclic tetracarboxylic dianhydride, the reactivity of cationic polymerization is higher and the chemical resistance of the cured film is improved, as compared with the aromatic acid dianhydride.

Furthermore, among the alicyclic tetracarboxylic dianhydrides, the alicyclic tetracarboxylic dianhydride having a polycyclic structure is preferable from the viewpoint of improving the chemical resistance and improving the ion migration resistance when formed into a cured product.

In addition, (A) the polymer compound of the present invention preferably has a structure derived from a compound represented by at least one of the following general formulae (3) and (4).

[Chemical Formula 4]

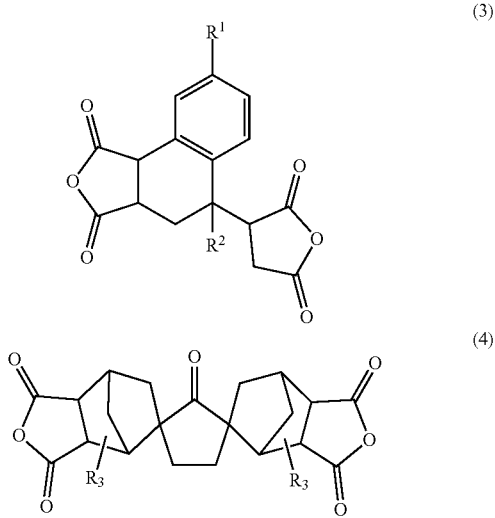

(3)

(4)

(In the formula, $R^1$, $R^2$, and $R^3$ each independently represent a hydrogen atom or a methyl group.)

When (A) the polymer compound has a structure derived from the compound represented by the general formula (3) or (4), the resin skeleton has flexibility, thereby it is preferable from the viewpoint of having high solubility in an organic solvent, hardly causing precipitation of a resin in the composition, and having excellent storage stability, as, the resin composition before curing.

In addition, specific examples of the organic group derived from the alicyclic tetracarboxylic dianhydride having a polycyclic structure include 4-(2,5-dioxotetrahydrofuran-3-yl)-1,2,3,4-tetrahydronaphthalene-1,2-dicarboxylic dianhydride, 4-(2,5-dioxotetrahydrofuran-3-yl)-4-methyl-1,2,3,4-tetrahydronaphthalene-1,2-dicarboxylic dianhydride, 4-(2,5-dioxotetrahydrofuran-3-yl)-7-methyl-1,2,3,4-tetrahydronaphthalene-1,2-dicarboxylic dianhydride, and norbornane-2-spiro-2'-cyclopentanone-5'-spiro-2''-norbornane-5,5'',6,6''-tetracarboxylic dianhydride, norbornane-2-spiro-2'-cyclohexanone-6'-spiro-2''-norbornane-5,5'',6,6''-tetracarboxylic dianhydride.

Furthermore, the carboxylic acid residue may include an acid dianhydride other than the alicyclic tetracarboxylic dianhydride having the polycyclic structure. Specific examples thereof include aromatic tetracarboxylic dianhydrides such as pyromellitic dianhydride, 3,3',4,4'-biphenyltetracarboxylic dianhydride, 2,3,3',4'-biphenyltetracarboxylic dianhydride, 2,2',3,3'-biphenyltetracarboxylic dianhydride, 3,3',4,4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, 1,1-bis(3,4-dicarboxyphenyl)ethane dianhydride, 1,1-bis(2,3-dicarboxyphenyl)ethane dianhydride, bis(3,4-dicarboxyphenyl)methane dianhydride, bis(2,3-dicarboxyphenyl)methane dianhydride, bis(3,4-dicarboxyphenyl)sulfone dianhydride, bis(3,4-dicarboxyphenyl)ether dianhydride, 1,2,5,6-naphthalenetetracarboxylic dianhydride, 9,9-bis(3,4-dicarboxyphenyl)fluorenic dianhydride, 9,9-bis{4-(3,4-dicarboxyphenoxy)phenyl}fluorenic dianhydride, 2,3,6,7-naphthalenetetracarboxylic dianhydride, 2,3,5,6-pyridinetetracarboxylic dianhydride, 3,4,9,10-perylenetetracarboxylic dianhydride, and 2,2-bis(3,4-dicarboxyphenyl)hexafluoropropane dianhydride, 3,3',4,4'-diphenylsulfonetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 5-(2,5-dioxotetrahydrofuryl)-3-methyl-3-cyclohexene-1,2-dicarboxylic dianhydride, 2,3,5-tricarboxy-2-cyclopentanacetic dianhydride, and 2,3,4,5-tetrahydrofurantetracarboxylic dianhydride, but are not limited thereto. In addition, these are used alone or in combination of two or more thereof.

The molar ratio of the structures represented by the general formulae (1) and (2) in the present invention can be determined by a method for calculating from the molar ratio of monomers used upon polymerization or a method for detecting peaks of a polyamide structure, an imide precursor structure, or an imide structure in the obtained resin, resin composition, or cured film using a nuclear magnetic resonance apparatus (NMR).

(A) The polymer compound having the structure in which the molecular chain terminal is derived from the carboxylic acid residue can be obtained, for example, in the case of a polyimide having the carboxylic acid residue at the molecular chain terminal, by increasing the content of an acid anhydride with respect to the diamine used upon polymerization. At that time, assuming that the total of the carboxylic acid residues of (A) the polymer compound is 100% by mole, the total of the amine residues is preferably 60% by mole or more and 98% by mole or less. That is, (A) the polymer compound is preferably a compound obtained by polymerization where the total of the amine residues is 60 to 98% by mole, assuming that the total of the carboxylic acid residues is 100% by mole. When the total of the amine residues is 60% by mole or more, the weight average molecular weight easily becomes 1,000 or more, and the film formability upon forming into a film shape is excellent. When the total of the amine residues is 98% by mole or less, the ratio in which the polymer compound having the amine residue at the terminal in included, is reduced, the cationic polymerization reaction easily proceeds, and the chemical resistance of the cured film is improved.

As another method for obtaining (A) the polymer compound having the structure in which the molecular chain terminal is derived from the carboxylic acid residue, (A) the polymer compound can also be obtained by using a specific compound, specifically, an acid anhydride, a monocarboxylic acid, a monoacid chloride compound, or a monoactive ester compound among compounds generally used as a terminal-blocking agent.

In addition, the molecular chain terminal of (A) the polymer compound is blocked with a terminal-blocking agent of a carboxylic acid or acid anhydride having a hydroxyl group, a carboxyl group, a sulfonic acid group, a thiol group, a vinyl group, an ethynyl group, or an allyl group, thereby the dissolution rate of (A) the polymer compound in an aqueous alkali solution and the mechanical properties of the resulting cured film can be easily adjusted to fall within preferable ranges. In addition, a plurality of terminal-blocking agents may be reacted to introduce a plurality of different terminal groups.

As acid anhydrides, monocarboxylic acids, monoacid chloride compounds, and monoactive ester compounds as the terminal-blocking agent, acid anhydrides such as phthalic anhydride, maleic anhydride, nadic anhydride, cyclohexanedicarboxylic anhydride, and 3-hydroxyphthalic anhydride, monocarboxylic acids such as 3-carboxyphenol, 4-carboxyphenol, 3-carboxythiophenol, 4-carboxythiophenol, 1-hydroxy-7-carboxynaphthalene, 1-hydroxy-6-carboxynaphthalene, 1-hydroxy-5-carboxynaphthalene, 1-mercapto-7-carboxynaphthalene, 1-mercapto-6-carboxynaphthalene, 1-mercapto-5-carboxynaphthalene, 3-carboxybenzenesulfonic acid, and 4-carboxybenzenesulfonic acid, monoacid chloride compounds in which these carboxyl groups are acid chlorinated, monoacid chloride compounds in which only one carboxyl group of dicarboxylic acids such as terephthalic acid, phthalic acid, maleic acid, cyclohexane dicarboxylic acid, 1,5-dicarboxynaphthalene, 1,6-dicarboxynaphthalene, 1,7-dicarboxynaphthalene, and 2,6-dicarboxynaphthalene is acid chlorinated, and active ester compounds obtained by the reaction of a monoacid chloride compound with N-hydroxybenzotriazole, imidazole, or N-hydroxy-5-norbornene-2,3-dicarboximide, and the like are preferable. Two or more of these compounds may be used.

The polymer compound into which these terminal-blocking agents are introduced is (A) the polymer compound having the structure in which the molecular chain terminal is derived from the carboxylic acid residue. The terminal-blocking agent that can be used to obtain (A) the polymer compound having the structure in which the molecular chain terminal is derived from the carboxylic acid residue can be easily detected by the following methods. For example, (A) the polymer compound into which the terminal-blocking agent is introduced is dissolved in an acidic solution to be decomposed into an amine component and an acid anhydride component which are constituent units, and the terminal-blocking agent used in the present invention can be easily detected by a gas chromatography (GC) or NMR. Alternatively, the terminal-blocking agent can be easily detected by directly measuring the resin component into which the terminal-blocking agent is introduced by a pyrolysis gas chromatography (PGC), or an infrared spectroscopy and a 13C-NMR spectroscopy.

In the present invention, (A) the polymer compound is synthesized, for example, by the following methods, but is not limited thereto. A polyimide structure is synthesized by a well-known method by replacing a part of the diamine with a primary monoamine as the terminal-blocking agent or by replacing the tetracarboxylic dianhydride with the dicarboxylic anhydride as the terminal-blocking agent. For example, methods such as a method for reacting a tetracarboxylic dianhydride, a diamine compound, and a monoamine at a low temperature, a method for reacting a tetracarboxylic dianhydride, a dicarboxylic anhydride, and a diamine compound at a low temperature, and a method for obtaining a diester from a tetracarboxylic dianhydride and an alcohol, and then reacting the resulting diester with a diamine and a monoamine in the presence of a condensing agent are used to obtain a polyimide precursor. Thereafter, a polyimide can be synthesized using a well-known imidization reaction method.

In the present invention, it is preferable that (A) the polymer compound is polymerized by the above-described method, then charged into a large amount of water, a mixed liquid of methanol and water, or the like, precipitated, filtered, dried, and isolated. The drying temperature is preferably 40 to 100° C. and more preferably 50 to 80° C. By this operation, unreacted monomers and oligomer components such as dimers and trimers are removed, and film properties after thermal curing can be improved.

The imidization rate in the present invention can be easily determined, for example, by the following method. First, the infrared absorption spectrum of the polymer is measured to confirm the presence of an absorption peak (near 1780 cm$^{-1}$ and near 1377 cm$^{-1}$) of the imide structure caused by the polyimide. Next, the resultant obtained by heat-treated the polymer at 350° C. for 1 hour is used as a sample having an imidization rate of 100%, an infrared absorption spectrum thereof is measured, and the content of imide groups in the resin before the heat treatment is calculated by comparing peak intensities near 1377 cm$^{-1}$ of the resin before and after the heat treatment to determine the imidization rate. The imidization rate is preferably 50% or more and more preferably 80% or more because a change in the ring-closing rate during thermal curing can be suppressed and an effect of reducing stress can be obtained.

The resin composition of the present invention includes (B) a cationic polymerizable compound. Examples of (B) the cationic polymerizable compound include a cyclic ether compound (an epoxy compound, an oxetane compound, and the like), an ethylenically unsaturated compound (a vinyl ether, styrenes, and the like), a bicyclo orthoester, a spiro orthocarbonate, and a spiro orthoester.

Well-known epoxy compounds and the like can be used as the epoxy compound, and include an aromatic epoxy compound, an alicyclic epoxy compound, and an aliphatic epoxy compound.

Examples of the aromatic epoxy compound include a glycidyl ether of monovalent or polyvalent phenol (phenol, bisphenol A, phenol novolac, and a compound that is an alkylene oxide adduct thereof) having at least one aromatic ring.

Examples of the alicyclic epoxy compound include a compound obtained by epoxidizing a compound having at least one cyclohexene or cyclopentene ring with an oxidizing agent (3,4-epoxycyclohexylmethyl-3,4-epoxycyclohexanecarboxylate and the like).

Examples of the aliphatic epoxy compound include a polyglycidyl ether of an aliphatic polyhydric alcohol or an alkylene oxide adduct thereof (1,4-butanediol diglycidyl ether, 1,6-hexanediol diglycidyl ether, and the like), a polyglycidyl ester of an aliphatic polybasic acid (diglycidyl tetrahydrophthalate and the like), and an epoxidized product of a long chain unsaturated compound (epoxidized soybean oil, epoxidized polybutadiene and the like).

As the oxetane compound, well-known compounds and the like can be used, and examples thereof include 3-ethyl-3-hydroxymethyloxetane, 2-ethylhexyl(3-ethyl-3-oxetanyl-methyl)ether, 2-hydroxyethyl(3-ethyl-3-oxetanylmethyl)ether, 2-hydroxypropyl(3-ethyl-3-oxetanylmethyl)ether, 1,4-bis[(3-ethyl-3-oxetanylmethoxy)methyl]benzene, oxetanyl silsesquioxetane, and phenol novolac oxetane.

As the ethylenically unsaturated compound, well-known cationic polymerizable monomers and the like can be used, and an aliphatic monovinyl ether, an aromatic monovinyl ether, a polyfunctional vinyl ether, styrene, and a cationic polymerizable nitrogen-containing monomer are included.

Examples of the aliphatic monovinyl ether include methyl vinyl ether, ethyl vinyl ether, butyl vinyl ether, and cyclohexyl vinyl ether.

Examples of the aromatic monovinyl ether include 2-phenoxyethyl vinyl ether, phenyl vinyl ether, and p-methoxyphenyl vinyl ether.

Examples of the polyfunctional vinyl ether include butanediol-1,4-divinyl ether and triethylene glycol divinyl ether.

Examples of the styrenes include styrene, α-methylstyrene, p-methoxystyrene, and p-tert-butoxystyrene.

Examples of the cationic polymerizable nitrogen-containing monomer include N-vinylcarbazole and N-vinylpyrrolidone.

Examples of the bicyclo orthoester include 1-phenyl-4-ethyl-2,6,7-trioxabicyclo[2.2.2]octane and 1-ethyl-4-hydroxymethyl-2,6,7-trioxabicyclo-[2.2.2]octane.

Examples of the spiro orthocarbonate include 1,5,7,11-tetraoxaspiro[5.5]undecane and 3,9-dibenzyl-1,5,7,11-tetraoxaspiro[5.5]undecane.

Examples of the spiro orthoester include 1,4,6-trioxaspiro[4.4]nonane, 2-methyl-1,4,6-trioxaspiro[4.4]nonane, and 1,4,6-trioxaspiro[4.5]decane.

Among these cationic polymerizable compounds, an epoxy compound, an oxetane compound, and a vinyl ether are preferable, an epoxy compound and an oxetane compound are more preferable, and an epoxy compound is particularly preferable. Among those, it is preferable that the epoxy compound is a polyfunctional epoxy compound that is liquid at normal temperature (20° C.), and has an epoxy equivalent of 80 g/eq. or more and 160 g/eq. or less. When the polyfunctional epoxy compound is liquid at normal temperature, it is preferable from the viewpoint of improving compatibility with (A) the polymer compound and obtaining fine pattern processability. On the other hand, when the epoxy equivalent of the polyfunctional epoxy compound is 80 g/eq. or more and 160 g/eq. or less, it is preferable from the viewpoint from improving the heat resistance and chemical resistance of the cured film.

Examples of the epoxy compound which is a polyfunctional epoxy compound that is liquid at normal temperature and has an epoxy equivalent of 80 g/eq. or more and 160 g/eq. or less include TEPIC-VL, (product name, manufactured by Nissan Chemical Corporation), a bisphenol A type epoxy compound, a bisphenol F type epoxy compound, and SHOWFREE BATG and SHOWFREE PETG (product name, all manufactured by SHOWA DENKO K.K.).

In addition, (B) the cationic polymerizable compound may be used alone or two or more thereof may be used in combination.

The content of (B) the cationic polymerizable compound is preferably 30 parts by mass or more and more preferably 50 parts by mass or more from the viewpoint of exhibiting sufficient cationic curability and improving pattern processability when the total of (A) the polymer compounds is 100 parts by mass. On the other hand, the content is preferably 200 parts by mass or less from the viewpoint that there is no tackiness on the surface of the film upon forming into a film shape and handling becomes easy.

The resin composition of the present invention includes (C) a cationic polymerization initiator. (C) The cationic polymerization initiator directly or indirectly generates an acid by light or heating to cause cationic polymerization. As (C) the cationic polymerization initiator, well-known compounds can be used without particular limitation, but a sulfonium salt is preferable. Specific examples of (C) the cationic polymerization initiator include an aromatic iodonium complex salt and an aromatic sulfonium complex salt. Specific examples of the aromatic iodonium complex salt include diphenyliodonium tetrakis(pentafluorophenyl)borate, diphenyliodonium hexafluorophosphate, diphenyliodonium hexafluoroantimonate, and di(4-nonylphenyl)iodonium hexafluorophosphate. These (C) cationic polymerization initiators may be used alone or two or more thereof may be used in combination.

In the present invention, (C) the cationic polymerization initiator is preferably a photocationic polymerization initiator. It is preferable from the viewpoint from being capable of providing a contrast of the progress of cationic polymerization between the light-irradiated portion and the non-light-irradiated portion by selecting a photocationic polymerization initiator as (C) the cationic polymerization initiator, and forming a pattern by dissolving the resin composition with any developer.

The content of (C) the cationic polymerization initiator is preferably 0.3 parts by mass or more, more preferably 0.5 parts by mass or more, and still more preferably 0.7 parts by mass or more assuming that (B) the cationic polymerizable compound is 100 parts by mass. Thus, the cationic polymerizable compound can exhibit sufficient curability, and pattern processability can be improved. On the other hand, the content is preferably 10 parts by weight or less and more preferably 8 parts by weight or less from the viewpoint of improving the storage stability of the resin composition before curing.

In the resin composition of the present invention, a sensitizer may be used in order to absorb ultraviolet rays and provide absorbed light energy to a photoacid generator. As the sensitizer, for example, an anthracene compound (9,10-dialkoxy-anthracene derivative) having alkoxy groups at positions 9 and 10 is preferable. Examples of the alkoxy group include an alkoxy group having 1 to 4 carbon atoms such as a methoxy group, an ethoxy group, and a propoxy group. The 9,10-dialkoxy-anthracene derivative may further have a substituent. Examples of the substituent include a halogen atom such as a fluorine atom, a chlorine atom, a bromine atom, and an iodine atom, an alkyl group having 1 to 4 carbon atoms such as a methyl group, an ethyl group, and a propyl group, a sulfonic acid alkyl ester group, and a carboxylic acid alkyl ester group. Examples of the alkyl in the sulfonic acid alkyl ester group and the carboxylic acid alkyl ester include alkyl having 1 to 4 carbon atoms such as methyl, ethyl, and propyl. The substitution position of these substituents is preferably 2 position.

The resin composition of the present invention may include a thermal crosslinking agent, and a compound having an alkoxymethyl group or a methylol group is preferable.

Examples of the compound having an alkoxymethyl group or a methylol group include DML-PC, DML-PEP, DML-OC, DML-OEP, DML-34X, DML-PTBP, DML-PCHP, DML-OCHP, DML-PFP, DML-PSBP, DML-POP, DML-MBOC, DML-MBPC, DML-MTrisPC, DML-BisOC-Z, DML-BisOCHP-Z, DML-BPC, DML-BisOC-P, DMOM-PC, DMOM-PTBP, DMOM-MBPC, TriML-P, TriML-35XL, TML-HQ, TML-BP, TML-pp-BPF, TML-BPE, TML-BPA, TML-BPAF, TML-BPAP, TMOM-BP, TMOM-BPE, TMOM-BPA, TMOM-BPAF, TMOM-BPAP, HML-TPPHBA, HML-TPHAP, HMOM-TPPHBA, HMOM-TPHAP (The above all are product names, manufactured by Honshu Chemical Industry Co., Ltd.), NIKALAC (registered trademark) MX-290, NIKALAC MX-280, NIKALAC MW-100LM, and NIKALAC MX-750LM (The above all are product names, manufactured by Sanwa Chemical Co., Ltd.).

The resin composition of the present invention can further include a silane compound. The silane compound is included, thereby improving the adhesion, of the heat-resistant resin coating film. Specific examples of the silane compound include N-phenylaminoethyltrimethoxysilane, N-phenylaminoethyltriethoxysilane, N-phenylaminopropyltrimethoxysilane, N-phenylaminopropyltriethoxysilane, N-phenylaminobutyltrimethoxysilane, N-phenylaminobutyltriethoxysilane, vinyltrimethoxysilane, vinyltriethoxysilane, vinyltrichlorosilane, vinyltris(R-methoxyethoxy)silane, 3-methacryloxypropyltrimethoxysilane, 3-acryloxypropyltrimethoxysilane, p-styryltrimethoxysilane, 3-methacryloxypropylmethyldimethoxysilane, and 3-methacryloxypropylmethyldiethoxysilane.

In addition, as necessary, the resin composition of the present invention may include a surfactant, esters such as ethyl lactate and propylene glycol monomethyl ether acetate, alcohols such as ethanol, ketones such as cyclohexanone and methyl isobutyl ketone, and ethers such as tetrahydrofuran and dioxane for the purpose of improving wettability with a base material. In addition, inorganic particles such as silicon dioxide and titanium dioxide, powder of polyimide, or the like may be included for the purpose of suppressing the thermal expansion coefficient, increasing the dielectric constant, decreasing the dielectric constant, and the like.

The shape of the resin composition of the present invention before curing is not limited, and examples thereof include a varnish state and a film shape. The resin composition film of the present invention has a film shape as a form of the resin composition of the present invention, that is, is a resin composition coating film formed from the resin composition of the present invention. Therefore, the resin composition film of the present invention may be a film-shaped resin composition film formed on a support, that is, may be a resin composition film having a resin composition coating film formed from the resin composition of the present invention on a support, or may be in an aspect without a support. When used in a varnish state, a solution obtained by dissolving the (A) to (C) components and components added as necessary in an organic solvent can be used. In addition, the resin composition film is obtained, for example, by applying the resin composition of the present invention onto a support and then drying the resultant as necessary.

Next, a method for producing a resin composition film using the resin composition of the present invention will be described. The resin composition film of the present invention is obtained by applying a solution (varnish) of the resin composition onto a support, and then drying the resultant as necessary. The resin composition varnish is obtained by adding an organic solvent to the resin composition. The organic solvent used here may be any organic solvent that dissolves the resin composition.

Specific examples of the organic solvent include ethers such as ethylene glycol monomethyl ether, ethylene glycol monoethyl ether, propylene glycol monomethyl ether, propylene glycol monoethyl ether, ethylene glycol dimethyl ether, ethylene glycol diethyl ether, and ethylene glycol dibutyl ether, acetates such as ethylene glycol monoethyl ether acetate, propylene glycol monomethyl ether acetate, propyl acetate, butyl acetate, isobutyl acetate, 3-methoxybutyl acetate, 3-methyl-3-methoxybutyl acetate, methyl lactate, ethyl lactate, and butyl lactate, ketones such as acetone, methyl ethyl ketone, acetylacetone, methyl propyl ketone, methyl butyl ketone, methyl isobutyl ketone, cyclopentanone, and 2-heptanone, alcohols such as butyl alcohol, isobutyl alcohol, pentanoyl, 4-methyl-2-pentanol, 3-methyl-2-butanol, 3-methyl-3-methoxybutanol, and diacetone alcohol, and aromatic hydrocarbons such as toluene and xylene as well as N-methyl-2-pyrrolidone, N-cyclohexyl-2-pyrrolidone, N,N-dimethylformamide, N,N-dimethylacetamide, dimethylsulfoxide, and γ-butyrolactone.

In addition, the resin composition varnish may be filtered using filter paper or a filter. The filtration method is not particularly limited, but a method for performing filtration by pressure filtration using a filter having a retaining particle diameter of 0.4 μm to 10 μm is preferable.

The resin composition film of the present invention is preferably formed on a support and used. The support is not particularly limited, and various commercially available films such as a polyethylene terephthalate (PET) film, a polyphenylene sulfide film, and a polyimide film can be usually used. The joint surface between the support and the resin composition film may be subjected to a surface treatment with silicone, a silane coupling agent, an aluminum chelating agent, polyurea, or the like in order to improve adhesion and peelability. In addition, the thickness of the support is not particularly limited, but is preferably in a range of 10 to 100 μm from the viewpoint of workability.

In addition, the resin composition film of the present invention may have a protective film on the film in order to protect the surface. Thereby, the surface of the photosensitive resin composition film can be protected from contaminants such as rubbish and dust in air. Examples of the protective film include a polyolefin film and a polyester film. The protective film preferably has a small adhesive force to the resin composition film.

Examples of the method for applying the resin composition varnish to the support include methods such as a spin coating using a spinner, a spray coating, a roll coating, a screen printing, a blade coater, a die coater, a die coater, a calender coater, a meniscus coater, a bar coater, a roll coater, a comma roll coater, a gravure coater, a screen coater, and a slit die coater. In addition, the film thickness applied varies depending on the application technique, the solid content concentration and the viscosity of the composition, and the like, but usually, the film thickness after drying is preferably 0.5 μm or more and 100 μm or less.

For drying, an oven, a hot plate, infrared rays, or the like can be used. The drying temperature and the drying time may be in a range in which the organic solvent can be volatilized, and it is preferable to appropriately set a range where the photosensitive resin composition film is in an uncured or semi-cured state. Specifically, the drying is preferably performed in a range of 40° C. to 120° C. for 1 minute to several tens of minutes. In addition, the temperature may be increased stepwise by combining these temperatures, and for example, the heat treatment may be performed at 70° C., 80° C., and 90° C. for 1 minute each.

Next, a method for pattern processing the resin composition varnish of the present invention or the resin composition film using the resin composition varnish, and a method for thermocompression-bonding the resin composition varnish to another member will be described with reference to examples.

First, a method for forming a resin composition coating film on a substrate using the resin composition of the present invention or a resin composition film using the resin composition will be described. When the resin composition varnish is used, the varnish is firstly applied onto the substrate. Examples of the applying method include methods such as a spin coating using a spinner, a spray coating, a roll coating, and a screen printing. In addition, the film thickness applied varies depending on the application technique, the solid content concentration and the viscosity of the resin composition, and the like, but usually, it is preferable to apply so that the film thickness after drying is 0.5 µm or more and 100 µm or less. Next, the substrate applied with the resin composition varnish is dried to obtain a resin composition coating film. For drying, an oven, a hot plate, infrared rays, or the like can be used. The drying temperature and the drying time may be in a range in which the organic solvent can be volatilized, and it is preferable to appropriately set a range where the resin composition coating film is in an uncured or semi-cured state. Specifically, the drying is preferably performed in a range of 50 to 150° C. for 1 minute to several hours.

On the other hand, when the resin composition film is used, the protective film is peeled off when having a protective film, and the resin composition film and the substrate are opposed to each other and bonded by thermocompression-bonding to obtain a resin composition coating film. The thermocompression-bonding can be performed by a heat press treatment, a heat lamination treatment, a heat vacuum lamination treatment, or the like. The bonding temperature is preferably 40° C. or higher from the viewpoint of adhesion and embeddability to the substrate. In addition, in order to keep the resin composition film from being cured upon bonding and the resolution of pattern formation in exposure and development steps from deteriorating, the bonding temperature is preferably 150° C. or lower.

In any case, examples of the substrate to be used include a silicon wafer, ceramics, gallium arsenide, an organic circuit board, an inorganic circuit board, and a substrate in which a constituent material of a circuit is disposed on these substrates, but are not limited thereto. Examples of the organic circuit board include a glass base material copper clad laminate such as a glass fabric and epoxy copper clad laminate plate, a composite copper clad laminate plate such as a glass nonwoven fabric and epoxy copper clad laminate, a heat resistant and thermoplastic substrate such as a polyetherimide resin substrate, a polyether ketone resin substrate, and a polysulfone-based resin substrate, and a flexible substrate such as a polyester copper clad film substrate and a polyimide copper clad film substrate. In addition, examples of the inorganic circuit board include a ceramic substrate such as an alumina substrate, an aluminum nitride substrate, and a silicon carbide substrate, and a metal-based substrate such as an aluminum base substrate and an iron base substrate. Examples of the constituent material of the circuit include a conductor including metal such as silver, gold, and copper, a resistor including an inorganic-based oxide or the like, a low dielectric including a glass-based material and/or a resin, or the like, a high dielectric including a resin, an inorganic particle having a high dielectric constant, or the like, and an insulator including a glass-based material or the like.

Next, the resin composition coating film formed by the above method is irradiated with actinic radiation through a mask having a desired pattern to be exposed. Examples of the actinic radiation used for exposure include ultraviolet rays, visible rays, electron beams, and X-rays. In the present invention, i-line (365 nm), h-line (405 nm), or g-line (436 nm) of a mercury lamp is preferably used. In the resin composition film, when the support has a quality of material which is transparent to these light rays, exposure may be performed without peeling the support from the resin composition film.

In order to form a pattern, an exposed portion is removed with a developer after exposure. The developer is preferably an aqueous solution of tetramethylammonium hydroxide, or an aqueous solution of a compound exhibiting alkaline such as diethanolamine, diethylaminoethanol, sodium hydroxide, potassium hydroxide, sodium carbonate, potassium carbonate, triethylamine, diethylamine, methylamine, dimethylamine, dimethylaminoethyl acetate, dimethylaminoethanol, dimethylaminoethyl methacrylate, cyclohexylamine, ethylenediamine, or hexamethylenediamine. In some cases, these alkaline aqueous solutions may include a polar solvent such as N-methyl-2-pyrrolidone, N,N-dimethylformamide, N,N-dimethylacetamide, dimethylsulfoxide, γ-butyrolactone, and dimethylacrylamide, alcohols such as methanol, ethanol, and isopropanol, esters such as ethyl lactate and propylene glycol monomethyl ether acetate, ketones such as cyclopentanone, cyclohexanone, isobutyl ketone, and methyl isobutyl ketone, and the like, alone or in combination of several kinds.

Development can be performed by a method for spraying the above developer on the coating film surface, liquid-plating the developer on the coating film surface, immersing the coating film in the developer, immersing the coating film and applying ultrasonic waves therein, or the like. Development conditions such as the development time and the temperature of the developer in the developing step may be conditions under which the exposed portion is removed and the pattern can be formed.

After development, a rinsing treatment is preferably performed with water. Here, alcohols such as ethanol and isopropyl alcohol, esters such as ethyl lactate and propylene glycol monomethyl ether acetate, and the like may be also added to water to perform the rinsing treatment.

Furthermore, a baking treatment may be performed before development as necessary. As a result, the resolution of the pattern after development may be improved, and the allowable range of development conditions may increase. The temperature of the baking treatment is preferably in a range of 50 to 180° C., and in particular, more preferably in a range of 60 to 120° C. The time is preferably 5 seconds to several hours.

After the pattern formation, an unreacted cationic polymerizable compound and the cationic polymerization initiator remain in the resin composition coating film. For this reason, upon thermocompression-bonding or curing, these may be thermally decomposed to generate gas. In order to avoid this, it is preferable to irradiate the entire surface of the resin composition coating film after the pattern formation with the above-described exposure light to generate an acid from the cationic polymerization initiator. As a result, a reaction of the unreacted cationic polymerizable compound proceeds upon thermocompression-bonding or curing, and generation of gas derived from thermal decomposition can be suppressed.

After development, a thermal crosslinking reaction is allowed to proceed by being subjected to a temperature of 150° C. to 500° C. By crosslinking, the heat resistance and the chemical resistance can be improved. As a method for the heat treatment, a method for selecting a temperature and raising the temperature stepwise or a method for selecting a certain temperature range and performing the heat treatment for 5 minutes to 5 hours while continuously raising the temperature can be selected. An example of the former includes a method in which the heat treatment is performed at 130° C. and 200° C. for 30 minutes each. An example of the latter includes a method for linearly raising the temperature from room temperature to 400° C. over 2 hours.

The cured film of the present invention is a cured film obtained by curing the resin composition coating film of the resin composition of the present invention or the resin composition film of the present invention. The cured film of the present invention obtained by curing the resin composition coating film of the resin composition or the resin composition film of the present invention can be used for electronic components such as semiconductor devices. The semiconductor device mentioned in the present invention refers to a general device that can function by utilizing characteristics of a semiconductor element. An electrooptical device or a semiconductor circuit board in which a semiconductor element is connected to a substrate, a device in which a plurality of semiconductor elements are laminated, and an electronic device including these are all included in the semiconductor device. In addition, electronic components such as a multilayer wiring board for connecting the semiconductor elements are also included in the semiconductor device. Specifically, the film is suitably used for applications such as a passivation film of a semiconductor, a surface protective film of a semiconductor element, an interlayer insulating film between a semiconductor element and wiring, an interlayer insulating film between a plurality of semiconductor elements, an interlayer insulating film between wiring layers of a multilayer wiring for high-density mounting, and an insulating layer of an organic electroluminescent element, but is not limited thereto, and can be used for various applications.

The cured film of the present invention can be also used as a roof portion of a structure (hereinafter, referred to as a hollow structure) having a hollow portion. That is, the hollow structure of the present invention is a hollow structure in which the roof portion of the hollow structure is the cured film of the present invention.

The hollow structure is a structure composed a recess or a protrusion provided in an electronic component and a roof portion, and is formed by thermocompression-bonding the resin composition film of the present invention to the recess or the protrusion. Thereafter, as necessary, the unnecessary portion is removed by the above-described pattern processing method, and the heat treatment is performed, thereby the hollow structure can be formed as a roof portion of the hollow structure.

The thickness of the roof portion of the hollow structure of the present invention is preferably 10 μm or more and 30 μm or less. When the thickness of the roof portion is 10 μm or more, it is preferable from the viewpoint of improving the film strength of the roof portion when the hollow structure is formed. On the other hand, when the thickness of the roof portion is 30 μm or less, the hollow structure can be thinned, thereby it is preferable from the viewpoint of contributing to downsizing of the electronic component.

Furthermore, the hollow structure having the cured film of the present invention is preferably blocked with a molding resin in order to enhance the fastness as an electronic component. That is, the hollow structure of the present invention preferably has a structure in which the outer peripheral portion is blocked with a molding resin. When the outer peripheral portion of the hollow structure is blocked with the molding resin, a transfer molding method or a compression molding method is generally used. The molding method as described above is formed by pouring the blocking resin dissolved at around 180° C. into the periphery of the electronic component at a pressure of around 6 MPa. That is, upon blocking, the pressure of around 6 MPa is applied to the roof portion of the hollow structure at a high temperature. When the cured film used as the roof portion of the hollow structure has low film strength, the roof portion of the hollow structure may be bended, resulting in collapsing the structure thereof. In this regard, the hollow structure using the cured film of the present invention as the roof portion of the hollow structure has sufficient film strength, and thus the yield of the electronic component in the blocking step of the molding resin is improved.

In the resin composition film of the present invention, the weight reduction rate when the resin composition coating film is heated at 200° C. is preferably 0.01% or more and 1.0% or less. When the weight reduction rate is within the above range, an outgas component from the resin composition coating film is suppressed when the cured film is formed as the roof portion of the hollow structure, and extreme swelling of the roof structure or bending due to curing shrinkage can be suppressed.

Note that, for the weight reduction rate upon heating at 200° C., using a thermogravimetric analyzer, a mass reduction rate is calculated after 8 to 12 mg of the mass of the resin composition coating film is weighed, the temperature raises from 40° C. to 200° C. at a temperature rising rate of 10° C./min, and then the resin composition coating film is held for 60 minutes, based on the weight after holding the resin composition coating film at 40° C. for 10 minutes in a state in which nitrogen gas is purged at 100 mL/min.

In addition, for the resin composition film of the present invention, the resin composition coating film preferably has a melt viscosity of $0.5 \times 10^6$ MPa·s or more and $1.0 \times 10^7$ MPa·s or less at 40° C. When the resin composition coating film of the resin composition film has a melt viscosity of $0.5 \times 10^6$ MPa·s or more at 40° C., tackiness on the surface of the film at room temperature is reduced, and handling of the film is facilitated. On the other hand, when the resin composition coating film of the resin composition film has a melt viscosity of $1.0 \times 10^7$ MPa·s or less at 40° C., cracks of the film at room temperature are reduced, defects of the film are reduced, and the yield is improved.

The melt viscosity of the resin composition coating film at 40° C. can be measured by the following method. First, the resin composition coating films of the resin composition films are opposed to each other and thermocompression-bonded at 60° C. to obtain a laminated resin composition film. The above operation is repeated to laminate until the resin composition coating film has a thickness of 600 to 700 μm. Next, the complex melt viscosity can be obtained by reading a value of the complex melt viscosity at 40° C. when the laminated resin composition coating film is subjected to temperature rising measurement at a temperature rising rate of 2° C./min from 30° C. to 80° C., a frequency of 0.2 Hz and a strain amount of 1.0% using a rheometer.

As described above, the resin composition of the present invention can be used as the roof portion of a hollow structure. In particular, when used as the roof portion, the amount of creep deformation at 180° C. after the resin composition coating film of the resin composition film is thermally cured is preferably 0.5% or more and 2.5% or less. When the amount of creep deformation is 0.5% or more, the toughness of the cured film is high, and when the electronic component having the cured film of the present invention as the roof structure of the hollow structure is blocked with a molding resin, generation of cracks in the roof structure is suppressed, and the yield of the electronic component is improved. On the other hand, when the amount of creep deformation is 2.5% or less, the bending of the roof structure is suppressed by the pressure upon mold blocking when blocked with the molding resin, and improve the yield of the mold-blocked electronic component can be improved while holding the hollow structure portion.

The method for measuring the amount of creep deformation at 180° C. after the resin composition coating film is thermally cured can be carried out as follows. First, the resin composition film on which the resin composition coating film having a thickness of 30 μm is formed is thermocompression-bonded to a glossy surface of a copper foil. Then, the base film is peeled off, and then exposed using an exposure machine as necessary. Thereafter, heating and curing is performed at 180° C. for 1 hour using an inert oven. A copper foil portion of an obtained copper foil with the cured film is etched using a ferric chloride solution to obtain the cured film of the resin composition coating film. Next, the obtained cured film is cut into a size of 8 cm×1 cm. Thereafter, using a universal testing machine, the obtained cured film sample is set in a chamber at 180° C. and held for 6 minutes until the temperature is stabilized, a tensile load is then applied with a chuck interval of 5 cm and a constant load of 5 N, and the amount of deformation after 300 seconds is read, thereby the amount of creep deformation can be measured.

EXAMPLES

Hereinafter, the present invention will be specifically described with reference to Examples, but the present invention is not limited thereto.

<Evaluation of Pattern Processability>

The protective film of the resin composition film produced in each of Examples and Comparative Examples was peeled off, and the peeled surface was laminated on a 4 inch silicon wafer using a vacuum diaphragm type laminator (MVLP-500/600 manufactured by MEIKI CO., LTD.) under the conditions of an upper and lower hot platen temperature of 80° C., a vacuuming time of 20 seconds, a vacuum press time of 30 seconds, and a bonding pressure of 0.5 MPa, to form a resin composition film on the silicon wafer. Then, after the support film was peeled off, a mask having patterns with via sizes of 30 μmφ, 20 μmφ, and 10 μmφ was set in an exposure apparatus, and exposure was performed at an exposure amount of 1000·mJ/cm$^2$ (i-line conversion, full wavelength exposure) using an ultra-high pressure mercury lamp under the condition of an exposure gap of 100 μm between the mask and the photosensitive resin composition film. After exposure, heating after exposure was performed at 120° C. for 10 minutes on a hot plate. Thereafter, in dipping development, an unexposed portion was removed using a 2.38% by mass aqueous solution of tetramethylammonium hydroxide, and a rinse treatment with water was performed. The development time was twice as long as the time when the unexposed portion was completely dissolved. The pattern thus obtained was observed with an optical microscope, and the minimum size when there was no abnormalities such as clogging on the pattern was taken as the evaluation of pattern processability. In addition, the case where all the patterns were dissolved was defined as 0 (poor).

<Evaluation of Glass Transition Temperature>

In the same manner as in the method for evaluating pattern processability, the substrate was changed from a silicon wafer to a copper foil (CF-T9DA-SV-1, manufactured by Fukuda Metal Foil & Powder Co., Ltd.) having a plane size of 10 cm×10 cm, and the resin composition film was formed on the copper foil. Then, the support film was peeled off, and then exposure was performed at an exposure amount of 1000 mJ/cm$^2$ (i-line conversion, full wavelength exposure) using an ultra-high pressure mercury lamp. After exposure, heating after exposure was performed at 120° C. for 10 minutes on a hot plate. Then, using an inert oven (INL-60, manufactured by Koyo Thermo Systems Co., Ltd.), the temperature was raised from room temperature to 200° C. over 60 minutes under a $N_2$ atmosphere (oxygen concentration: 20 ppm or less), and then the heat treatment was performed at 200° C. for 60 minutes to obtain the cured film of the resin composition film formed on the copper foil.

Thereafter, only the copper foil of the resin composition film formed on the copper foil was dissolved in a ferric chloride solution, and the resultant was washed with water, and air-dried to obtain the cured film of the resin composition film alone. The obtained cured film was cut into a test piece having a size of 5 mm×40 mm, and measurement was performed using a dynamic viscoelasticity measuring device DVA-200 (manufactured by IT Measurement Control Co., Ltd.) under the conditions of a distance between chucks of 20 mm, a frequency of 1 Hz, a temperature range of room temperature to 350° C., a temperature rising rate of 5° C./min, and a measurement strain of 0.1%, and the temperature of peak top of tan δ=storage elastic modulus/loss elastic modulus, from which the ratio of the storage elastic modulus to the loss elastic modulus was taken, was taken as the glass transition temperature. In addition, in the case where the pattern was dissolved in the evaluation of the pattern processability, the glass transition temperature was not evaluated and this case was defined as 0 (poor).

<Evaluation of Tensile Strength and Tensile Elongation>

The cured film of the resin composition film alone was obtained in the same manner as in the method for evaluating the glass transition temperature. The obtained cured film was cut into a test piece having a size of 10 mm×80 mm, and the tensile test was performed at room temperature, a distance between chucks of 50 mm, and a tensile speed of 50 mm/min using a universal testing machine AG-Xplus (manufactured by Shimadzu Corporation) and a 50 N load cell to measure the tensile strength (stress at break) and the tensile elongation (elongation at break). The measurement was performed on 10 test pieces per specimen, and the average value of the top 5 points was obtained from the results. In addition, in the case where the pattern was dissolved in the evaluation of the pattern processability, the tensile strength and the tensile elongation were not evaluated and this case was defined as 0 (poor).

The compounds used in each of Examples and Comparative Examples were synthesized by the following methods.

Synthesis Example 1 Synthesis of Hydroxyl Group-Containing Diamine Compound (a)

2,2-bis(3-amino-4-hydroxypheny) hexafluoropropane (hereinafter, referred to as BAHF) (18.3 g, 0.05 mol) was dissolved in 100 mL of acetone and propylene oxide (17.4 g, 0.3 mol) and the mixture was cooled to −15° C. A solution obtained by dissolving 3-nitrobenzoyl chloride (20.4 g, 0.11 mol) in 100 mL of acetone was added dropwise thereto. After completion of dropping, the mixture was reacted at −15° C. for 4 hours, and then the temperature was returned to room temperature. The precipitated white solid was separated by filtration and vacuum-dried at 50° C.

30 g of the obtained white solid was placed in a 300 mL stainless steel autoclave and dispersed in 250 mL of methyl cellosolve, and 2 g of 5% palladium-carbon was added thereto. Hydrogen was introduced thereinto with a balloon, and a reduction reaction was performed at room temperature. After about 2 hours, the reaction was terminated after confirming that the balloon did not deflate any more. After completing the reaction, the palladium compound as a catalyst was removed by filtration, and the mixture was concentrated using a rotary evaporator to obtain a hydroxyl group-containing diamine compound (a) represented by the following formula. The obtained solid was used as it was for the reaction.

[Chemical Formula 5]

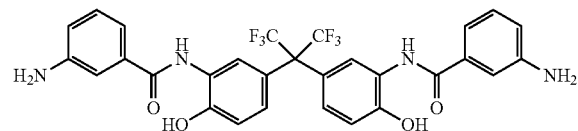

Synthesis Example 2 Synthesis of Polyamide (A-1) Under a dry nitrogen stream, BAHF (29.30 g, 0.08 mol) was added to 100 g of γ-butyrolactone (hereinafter, referred to as GBL), and the mixture was stirred and dissolved at room temperature. Thereafter, 4,4'-diphenyl ether dicarboxylic acid dichloride (29.52, 0.1 mol) was added thereto little by little while maintaining the temperature of the reaction solution at −10 to 0° C., and after completing the addition, the temperature was raised to room temperature, and the reaction solution was continued to stirred for 3 hours. Next, the reaction solution was charged into 3 L of water to collect a white precipitate. This precipitate was collected by filtration, washed three times with water, and then dried in a vacuum dryer at 80° C. for 5 hours.

Synthesis Example 3 Synthesis of Polyimide (A-2)

Under a dry nitrogen stream, BAHF (29.30 g, 0.08 mol) was added to 80 g of GBL, and the mixture was stirred and dissolved at 120° C. Next, 4-(2,5-dioxotetrahydrofuran-3-yl)-1,2,3,4-tetrahydronaphthalene-1,2-dicarboxylic dianhydride (hereinafter, referred to as TDA-100) (30.03 g, 0.1 mol) was added thereto together with 20 g of GBL, and the mixture was stirred at 120° C. for 1 hour and then stirred at 200° C. for 4 hours to obtain a reaction solution. Next, the reaction solution was charged into 3 L of water to collect a white precipitate. This precipitate was collected by filtration, washed three times with water, and then dried in a vacuum dryer at 80° C. for 5 hours.

Synthesis Example 4 Synthesis of Polyamideimide (A-3)

Under a dry nitrogen stream, a hydroxyl group-containing diamine compound (a) (31.43 g, 0.08 mol) was added to 80 g of GBL, and the mixture was stirred at 120° C. Next, TDA-100 (30.03 g, 0.1 mol) was added thereto together with 20 g of GBL, and the mixture was stirred at 120° C. for 1 hour and then stirred at 200° C. for 4 hours to obtain a reaction solution. Next, the reaction solution was charged into 3 L of water to collect a white precipitate. This precipitate was collected by filtration, washed three times with water, and then dried in a vacuum dryer at 80° C. for 5 hours.

Synthesis Example 5 Synthesis of Polyimide (A-4)

Under a dry nitrogen stream, BAHF (25.64 g, 0.07 mol) was added to 70 g of GBL, and the mixture was stirred and dissolved at 120° C. Next, norbornane-2-spiro-2'-cyclopentanone-5'-spiro-2''-norbornane-5,5',6,6''-tetracarboxylic dianhydride (38.44 g, 0.1 mol) was added thereto together with 20 g of GBL, and stirred at 120° C. for 1 hour and then stirred at 200° C. for 4 hours to obtain a reaction solution. Next, the reaction solution was charged into 3 L of water to collect a white precipitate. This precipitate was collected by filtration, washed three times with water, and then dried in a vacuum dryer at 80° C. for 5 hours.

Example 1

10 g of the polyamide (A-1) obtained in Synthesis Example 2 as (A) a component, 10 g of TEPIC-VL (product name, manufactured by Nissan Chemical Corporation) as (B) a component, 0.6 g of CPI-310B (product name, manufactured by San-Apro Ltd.) as (C) a component, and 0.8 g of KBM-403 (product name, manufactured by Shin-Etsu Chemical Co., Ltd.) as a silane compound were dissolved in GBL. The addition amount of the solvent was adjusted so that an additive other than the solvent was defined as a solid content and the solid content concentration was 60% by weight. Thereafter, pressure filtration was performed using a filter having a retaining particle diameter of 1 μm to obtain a resin composition varnish.

The obtained resin composition varnish was applied onto a PET film having a thickness of 50 μm using a comma roll coater, and the resultant was dried at 120° C. for 8 minutes, and then laminated with a PP film having a thickness of 10 μm as a protective film to obtain a resin composition film. The film thickness of the resin composition film was adjusted to be 25 μm. Using the obtained resin composition film, the pattern processability, the glass transition temperature, and the tensile strength and the tensile elongation were evaluated as described above. The results are shown in Table 1.

Examples 2 to 9

Resin composition films were produced in the same manner as in Example 1, and the pattern processability, the glass transition temperature, and the tensile strength and tensile elongation were evaluated as described above except that the (A) to (C) components and other components were changed to compounds having the following structures, and the mixing ratios thereof were changed as shown in Table 1. The results are shown in Table 1.

Example 10

A resin composition film was produced in the same manner as in Example 2, and in the evaluation of the pattern processability, the evaluation was performed in the same manner except that a 2.38% by mass aqueous solution of tetramethylammonium hydroxide and water for rinsing were changed to propylene glycol monomethyl ether acetate and isopropyl alcohol, respectively. The results are shown in Table 1.

Comparative Example 1

A resin composition film was produced in the same manner as in Example 9 except that the (A) to (C) components and other components were changed to compounds having the following structures, and the mixing ratio thereof was changed as shown in Table 1, and the pattern processability, the glass transition temperature, and the tensile strength and tensile elongation were evaluated as described above. The results are shown in Table 1.

TABLE 2

|  | Example 11 | Example 12 | Comparative Example 2 |
|---|---|---|---|
| Resin composition | Example 2 | Example 5 | Comparative Example 1 |
| Weight reduction rate (%) | 0.1 | 0.3 | 0.1 |
| Melt viscosity (Pa · s) | $1.8 \times 10^6$ | $3.0 \times 10^6$ | $0.2 \times 10^6$ |
| Amount of creep deformation (%) | 2.4 | 2.0 | 4.0 |

Note that the structures of the compounds used in each of Synthesis Examples, Examples, and Comparative Examples were shown below.

(A) Polymer Compound

A-1: Polyamide having a carboxylic acid residue at a molecular chain terminal

A-2: Polyimide having a carboxylic acid residue at a molecular chain terminal

A-3: Polyamideimide having a carboxylic acid residue at a molecular chain terminal

TABLE 1

| | | Resin composition (parts by mass) | | | | | |
|---|---|---|---|---|---|---|---|
| | | Example 1 | Example 2 | Example 3 | Example 4 | Example 5 | Example 7 |
| (A) Component | Polyamide (A-1) | 100 | | | | | |
| | Polyimide (A-2) | | 100 | | 100 | 100 | 100 |
| | Polyamideimide (A-3) | | | 100 | | | |
| | Polyimide (A-4) | | | | | | |
| | 1007 | | | | | | |
| (B) Component | TEPIC-VL | 100 | 100 | 100 | 50 | | 50 |
| | PETG | | | | 50 | 50 | |
| | BATG | | | | | 50 | |
| (C) Component | CPI-210S | | 6 | | 6 | 6 | 3 |
| | CPI-310B | 6 | | 6 | | | |
| Silane compound | KBM-403 | 8 | 8 | 8 | 8 | 8 | 6 |
| Pattern processability (μm) | | 30 | 10 | 20 | 10 | 10 | 10 |
| Glass transition temperature (° C.) | | 255 | 225 | 265 | 260 | 270 | 235 |
| Tensile strength (MPa) | | 110 | 100 | 105 | 100 | 90 | 95 |
| Tensile elongation (%) | | 12 | 9 | 10 | 7 | 6 | 8 |

| | | Resin composition (parts by mass) | | | |
|---|---|---|---|---|---|
| | | Example 8 | Example 9 | Example 10 | Comparative Example 1 |
| (A) Component | Polyamide (A-1) | | | | |
| | Polyimide (A-2) | 100 | | 100 | |
| | Polyamideimide (A-3) | | | | |
| | Polyimide (A-4) | | 100 | | |
| | 1007 | | | | 100 |
| (B) Component | TEPIC-VL | 150 | 100 | 100 | 100 |
| | PETG | | | | |
| | BATG | | | | |
| (C) Component | CPI-210S | 9 | 6 | 6 | 6 |
| | CPI-310B | | | | |
| Silane compound | KBM-403 | 10 | 8 | 8 | 8 |
| Pattern processability (μm) | | 10 | 20 | 10 | 10 |
| Glass transition temperature (° C.) | | 215 | 265 | 225 | 160 |
| Tensile strength (MPa) | | 95 | 105 | 100 | 65 |
| Tensile elongation (%) | | 7 | 10 | 9 | 10 |

A-4: Polyimide having a carboxylic acid residue at a molecular chain terminal

Polymer Compounds Other than the Above (A)

1007 (BisA type phenoxy resin, manufactured by Mitsubishi Chemical Corporation)

(B) Cationic Polymerizable Compound

TEPIC-VL (manufactured by Nissan Chemical Corporation), liquid at normal temperature, epoxy equivalent=128 g/eq.

PETG (manufactured by Showa Denko K.K.), liquid at normal temperature, epoxy equivalent=90 g/eq.

BATG (manufactured by Showa Denko K.K.), liquid at normal temperature, epoxy equivalent=113 g/eq.

[Chemical Formula 6]

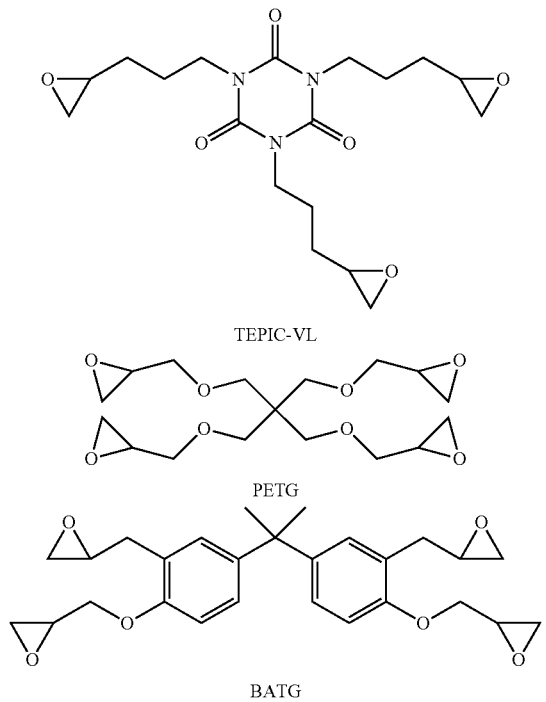

TEPIC-VL

PETG

BATG (C) Cationic Polymerization Initiator

CPI-210S (sulfonium salt-based photoacid generator, manufactured by San-Apro Ltd.)

CPI-310B (sulfonium salt-based photoacid generator, manufactured by San-Apro Ltd.)

Silane Compound

KBM-403 (3-glycidoxypropyltrimethoxysilane, manufactured by Shin-Etsu Chemical Co., Ltd.)

<Evaluation of Weight Reduction Rate>

The protective film of the resin composition film produced in each of Examples and Comparative Examples was peeled off, and 8 to 12 mg of the resin composition coating film was taken out using a spatula. Thereafter, using a thermogravimetry apparatus TG/DTA6200 (manufactured by Hitachi High-Tech Science Corporation), a mass was read to calculate the weight reduction rate after the temperature raises from 40° C. to 200° C. at a temperature rising rate of 10° C./min, and then the resin composition coating film is held for 60 minutes, based on the weight after holding the resin composition coating film at 40° C. for 10 minutes in a state in which nitrogen gas is purged at 100 mL/min.

<Melt Viscosity>

The protective film of the resin composition film produced in each of Examples and Comparative Examples is peeled off, and the resin composition coating films of the resin composition films are opposed to each other and thermocompression-bonded at 60° C. to obtain a laminated resin composition coating film (a laminate of resin composition films). Next, the laminate of the resin composition coating film obtained by peeling the PET film of the laminate of the resin composition coating film and the resin composition coating film obtained by peeling the protective film of the resin composition film are opposed to each other and thermocompression-bonded as described above to obtain a laminate of the resin composition coating film. Thereafter, the above operation was repeated to laminate until the laminate of the resin composition coating film had a thickness of 600 to 700 μm. Next, the value of the complex melt viscosity at 40° C. when the laminate of the resin composition coating film was subjected to a temperature rising measurement at a frequency of 0.2 Hz, a strain amount of 1.0%, and a temperature rising rate of 2° C./min from 30° C. to 80° C. using a disposable parallel plate having a diameter of 15 mm with a rheometer MCR302 (manufactured by Anton Paar GmbH)

<Amount of Creep Deformation>

A cured film of the resin composition film alone was obtained in the same manner as in the method for evaluating the glass transition temperature except that the thickness of the resin composition coating film was 30 μm. The obtained cured film was cut into a test piece having a size of 10 mm×80 mm, the obtained test piece was set in a chamber at 180° C. using a universal testing machine AG-Xplus (manufactured by Shimadzu Corporation) and a 50 N load cell and held for 6 minutes until the temperature was stabilized, then a tensile load was applied at 5 N of a constant load with a chuck interval of 5 cm, and the amount of deformation after 300 seconds was read, and the amount of deformation from the initial chuck interval was taken as the amount of creep deformation.

Examples 11 and 12

The resin composition films obtained in Examples 2 and 5 were used to evaluate the weight reduction rate, the melt viscosity, and the amount of creep deformation as described above. The results are shown in, Table 2.

Comparative Example 2

The resin composition film of Comparative Example 1 was used to evaluate the weight reduction rate, the melt viscosity, and the amount of creep deformation as described above. The results are shown in Table 1.

The invention claimed is:

1. A resin composition consisting essentially of:

(A) a polymer compound a having a structure in which a molecular chain terminal is derived from a carboxylic acid residue and having a structure derived from a compound represented by at least one of the following formulae (3) and (4):

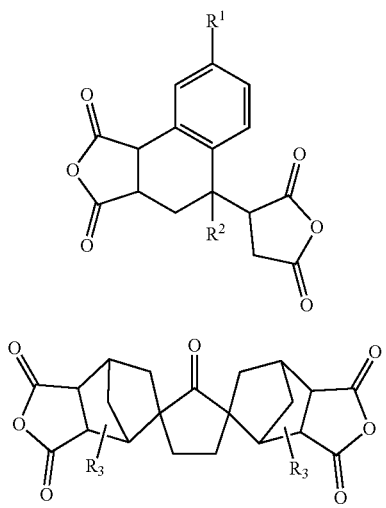

wherein R¹, R², and R³ each independently represent a hydrogen atom or a methyl group, (B) a cationic polymerizable compound comprising an epoxy, oxetane or vinyl ether compound, and (C) a cationic polymerization initiator comprising a sulfonium salt, wherein (A) the polymer compound is 30 to 70% by mass, and (B) the cationic polymerizable compound is 30 to 70% by mass, based on a resin total of 100% by mass, (C) the cationic polymerization initiator is 0.3 to 10 parts by mass based on 100 parts by mass of (B) the cationic polymerizable compound and the resin composition is curable by a cationic polymerization reaction.

2. The resin composition according to claim 1, wherein (A) the polymer compound is a compound obtained by polymerization where a total of amine residues is 60 to 98% by mole, based on a total amount of carboxylic acid residues of 100% by mole.

3. The resin composition according to claim 1, wherein (B) the cationic polymerizable compound is a polyfunctional epoxy compound that is liquid at normal temperature and has an epoxy equivalent of 80 to 160 g/eq.

4. A resin composition film comprising a resin composition coating film formed from the resin composition according to claim 1.

5. The resin composition film according to claim 4, wherein, when the resin composition coating film is heated at 200° C., a weight reduction rate is 0.01 to 1.0%.

6. The resin composition film according to claim 4, wherein the resin composition coating film has a melt viscosity of $0.5 \times 10^6$ to $1.0 \times 10^7$ MPa·s at 40° C.

7. The resin composition film according to claim 4, wherein, after the resin composition coating film is thermally cured, an amount of creep deformation at 180° C. is 0.5 to 2.5%.

8. A cured film obtained by curing the resin composition coating film of the resin composition according to claim 1.

9. A hollow structure, wherein the cured film according to claim 8 is used as a roof portion of a structure having a hollow portion (hereinafter, referred to as a hollow structure).

10. The hollow structure according to claim 9, wherein a thickness of the roof portion is 10 to 30 km.

11. An electronic component, wherein the hollow structure according to claim 9 has a structure in which an outer peripheral portion is blocked with a molding resin.

* * * * *